(12) United States Patent
Chrysanthakopoulos (10) Patent No.: US 6,643,714 B1
(45) Date of Patent: Nov. 4, 2003

(54) MODIFICATION AND USE OF CONFIGURATION MEMORY USED DURING OPERATION OF A SERIAL BUS

(75) Inventor: Georgios Chrysanthakopoulos, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/441,264

(22) Filed: Nov. 16, 1999

Related U.S. Application Data
(60) Provisional application No. 60/126,159, filed on Mar. 25, 1999.

(51) Int. Cl.[7] .................................................. G06F 3/00
(52) U.S. Cl. ..................... 710/8; 710/1; 710/2; 710/10; 710/38; 710/13; 710/313; 710/305; 370/202; 709/227
(58) Field of Search ........................... 710/8, 10, 2, 13, 710/38, 19, 313, 305, 1; 340/825; 370/402; 709/227

(56) References Cited

U.S. PATENT DOCUMENTS

| | | | | |
|---|---|---|---|---|
| 5,968,152 A | * | 10/1999 | Staats | 707/200 |
| 6,031,977 A | * | 2/2000 | Pettus | 709/230 |
| 6,233,611 B1 | * | 5/2001 | Ludtke et al. | 700/9 |

OTHER PUBLICATIONS

Watanabe et al., patent application Publication No: US 2001/0032275 A1, publication date: Oct, 18, 2001.*
Dan Steinberg and Yitzhak Birk, An Empirical Analysis of the IEEE–1394 Serial Bus Protocol, pp. 58–64, No date provided.

*An Empirical Analysis of the IEEE–1394 Serial Bus Protocol;* Dan Steinberg, Yitzhak Birk, Technion —Israel Institute of Technology; Jan.–Feb. 2000.

1394 Developer's Conference 1999 Agenda listing presentation of "Emulation of a 1934 Device On a Standard Platform" by Nilesh Dange, NitAl Consulting Services on Jun. 4, 1999 (document printed on Jul. 22, 1999).

* cited by examiner

*Primary Examiner*—Jeffrey Gaffin
*Assistant Examiner*—Niketa Patel
(74) *Attorney, Agent, or Firm*—Banner & Witcoff, Ltd.

(57) ABSTRACT

Information stored in configuration memory of a first device coupled to a communication bus is exposed to other devices allowing the other devices to ascertain the functionality of the first device. A device driver corresponding to the device can, through an interface, cause a bus driver to alter the contents of the configuration memory thereby changing what information is exposed to other devices. When another device "enumerates" the now-altered configuration memory, the other device will learn of the new functionality and proceed in a normal fashion by loading those drivers necessary to use the newly-added functionality. Conversely, when a device and its corresponding device driver is removed, configuration memory is updated accordingly. The present invention may be beneficially applied to systems adhering to the IEEE 1394 Serial Bus standard.

21 Claims, 8 Drawing Sheets

MODIFICATION AND USE OF CONFIGURATION MEMORY USED DURING OPERATION OF A SERIAL BUS

This application claims the benefit of Provisional application Ser. No. 60/126,159, filed Mar. 25, 1999.

TECHNICAL FIELD

The present invention relates generally to the use of serial buses as a means of communication between electronic devices and, in particular, to the modification and use of configuration memory used during the operation of a serial bus, such as a serial bus operating in conformance with the IEEE 1394 Serial Bus standard.

BACKGROUND OF THE INVENTION

Computer systems are typically comprised of a variety of different components or "devices" that operate together to form the resultant system. Typically, some of the devices are supplied with the computer system initially, such as the central processing unit, and some devices can be installed into the computer system after the initial configuration of the system. The devices of the computer system are generally coupled together via interconnects which may be of several types, such as a serial bus.

Serial buses are well known in the art. A recently developed serial bus standard is the so-called IEEE 1394 serial bus standard, based largely upon the internationally adopted ISO/IEC 13213 (ANSI/IEEE 1212) CSR Architecture Specification and the IEEE 1394-1995 Serial Bus Specification, the teachings of which are herein incorporated by these references. A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities which can be independently reset and identified. Nodes are associated with respective components of the computer system and serve as interfaces between the components and the communications links. Nodes are logical entities, each with a unique address. In a preferred implementation, each node provides a so-called configuration ROM (read-only memory)—hereinafter referred to as configuration memory—and a standardized set of control registers that can be accessed by software residing within the computer system.

The configuration memory of a given node provides, in part, a description of the functional capabilities of that node. The configuration memory for each node residing on the serial bus is exposed to all other nodes. During a configuration process, other nodes access each node's configuration memory (a process often referred to as "enumerating") in order to determine the proper system configuration. Thus, one function of the configuration memory of a given node is to instruct other nodes as to the given node's functional capabilities, thereby allowing the other nodes to determine which device drivers to load. As known in the art, for a general computer system having a number of devices, each device has an associated driver that, among other functions, configures the device and allows the device to be operable within the overall system. Drivers are typically software instructions that can be loaded into the computer's memory and, when executed, will communicate with the device to properly configure the device for operation. The driver may initialize the device so that the device can function and the driver may also allow the device to communicate within the overall system.

The information provided in configuration memory is typically treated as static as evidenced, for example, by the use of the "read-only memory" terminology used in the IEEE 1394 standard. A technique that allows a configuration memory to be changed such that a 1394 device node may dynamically emulate new device capabilities is not currently known in the art. However, such a technique would offer significant advantages over the prior art.

SUMMARY OF THE INVENTION

The present invention provides a technique for altering the information contained in a configuration memory, thereby providing greater flexibility in adding or sharing functionality in a computer-based system. The information stored in the configuration memory of a device coupled to a communication bus is exposed to and used by other devices to ascertain the functionality of the device. Preferably, the device is either integrated within, or coupled to, a computer platform, such as a personal computer (PC). A device driver corresponding to the device can, through an interface, cause a bus driver to alter the contents of a node's configuration memory thereby changing what information is exposed to other devices. When another node "enumerates" the now-altered node, the other node will learn of the new functionality and proceed in a normal fashion by loading those drivers necessary to use the newly-added functionality. Conversely, when a device and its corresponding device driver is removed, the node's configuration memory is updated accordingly.

In one embodiment of the present, invention, any PC coupled via an IEEE 1394 standard compliant serial bus to one or more 1394-compliant devices could be used to emulate the functionality of virtually any 1394-compliant device. In turn, this emulation capability allows developers to simulate device/peripheral functionality during development. In another embodiment of the present invention, peripherals coupled to the "emulating" PC but not otherwise available via the serial bus can be exposed to other devices coupled to the PC via the serial bus. For example, a PC having a Digital Video Disc (DVD) drive coupled thereto can emulate to other 1394 nodes that it is a DVD drive, thereby allowing the other 1394 nodes to access the DVD drive functionality.

DETAILED DESCRIPTION OF THE INVENTION

Figure 1:
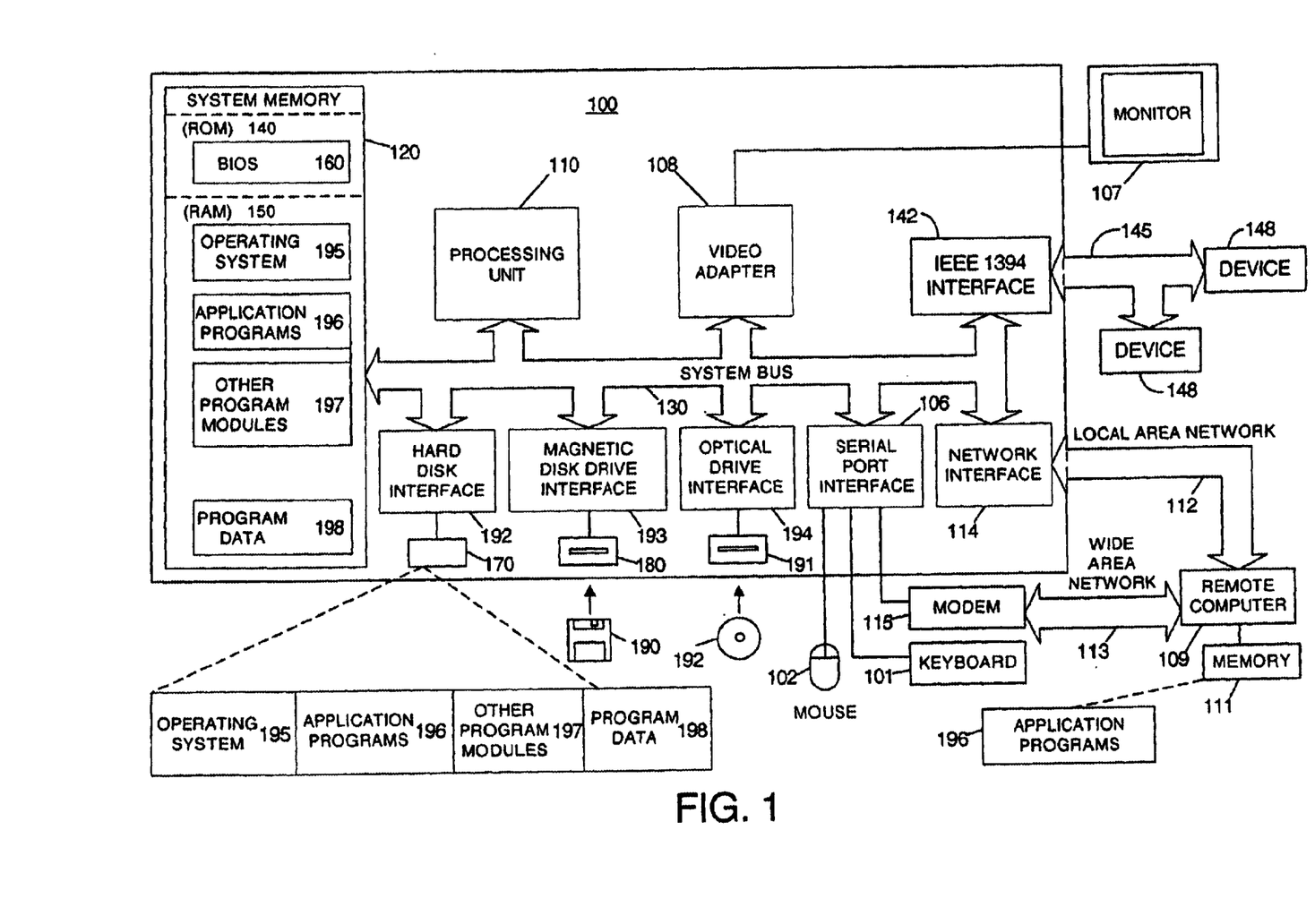
FIG. 1 is a schematic block diagram of a conventional general-purpose digital computing environment that may be used to implement various aspects of the present invention.

The present invention may be more fully described with reference to FIGS. 1–9. FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An additional serial port in the form of an IEEE 1394 interface 142 may also be provided. The IEEE 1394 interface 142 couples an IEEE 1394-compliant serial bus 145 to the system bus 130 or similar communication bus. The IEEE 1394-compliant serial bus 145, as known in the art, allows multiple devices 148 to communicate with the computer 100 and each other using high-speed serial channels.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server.

Figure 2:
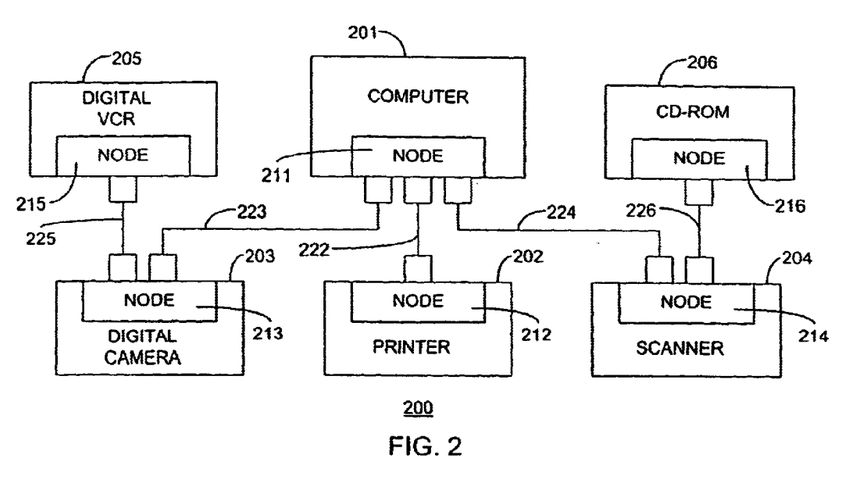
FIG. 2 is a schematic block diagram of a system of devices and corresponding nodes coupled together via a serial bus.
Figure 3:
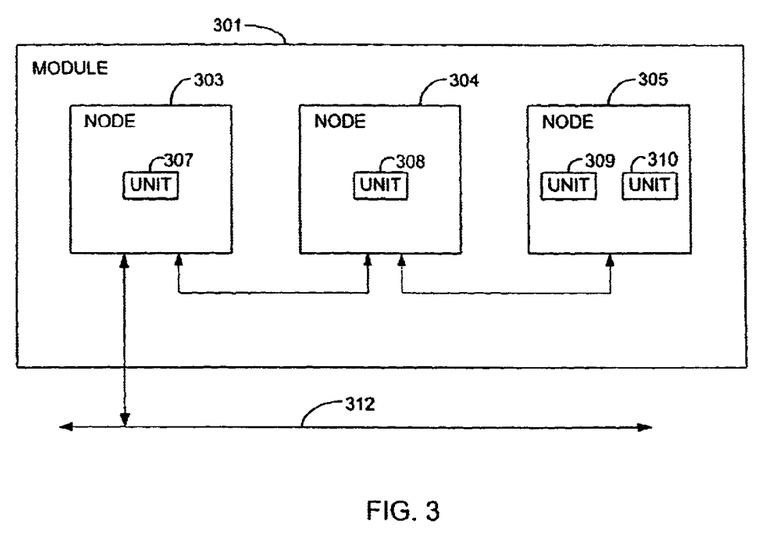
FIG. 3 is a schematic block diagram illustrating an exemplary logical node architecture for use in communicating via a serial bus.

Procedures of the present invention to be described below can operate within the environment of the computer 100 shown in FIG. 1. Although the present invention is generally applicable to a computer operating in accordance with the IEEE 1394 standard, the present invention is applicable to any computer system that implements the Control and Status Registers (CSR) configuration ROM architecture described in the ISO/IEC 13213 (ANSI/IEEE 1212) CSR Architecture Specification. An exemplary system of devices 200 communicating via a serial bus, to which system the present invention may be beneficially applied, is illustrated in FIG. 2.

The system 200 comprises several devices including a computer 201 (such as the computer 100 of FIG. 1), a printer 202, a digital camera 203, a scanner 204, a digital VCR 205 and a CD-ROM 206. As shown, the devices 201–206 are coupled to each other via multiple interconnections 222–226. Each of the interconnections 222–226 is preferably constructed in accordance with the IEEE 1394 standard and includes a first differential signal pair for conducting a first signal, a second differential signal pair for conducting a second signal, and a pair of power lines. Although specific devices are shown in FIG. 2, those having ordinary skill in the art will recognize that a wide variety of electrical/electronic devices could be coupled together in this manner using a similarly wide variety of interconnections. Although not shown, the computer 201 may include one or more devices that are normally not functionally available to the other devices 202–206. Collectively, the interconnections 222–226 constitute the cabling of the serial bus and a plurality of nodes 211–216 implement the functionality of the serial bus. Each of the devices of the computer system 200 is coupled to a node of the serial bus. In general, the device to which a node is coupled acts as the "local host" for that node. For example, the computer 201 is the local host for the computer node 211; the printer 202 is the local host for the printer node 212; the digital camera 203 is the local host for the digital camera node 213; the scanner 204 is the local host for the scanner node 214; the digital VCR 205 is the local host for the digital VCR node 215; and the CD-ROM 206 is the local host for the CD-ROM node 216. It is not necessary for every node to have a local host, nor is it necessary that the local host always be powered.

Each of the nodes 211–216 may have identical construction, although some of the nodes can be simplified because of their specific functions. Thus, the nodes can be modified to meet the needs of the particular local host. For example, each node has one or more ports, the number of and which is dependent upon its needs. For example, the computer node 211, as illustrated, has three ports, while the digital VCR node 215 has only one port.

Each of the nodes 211–216 also provides an address space which can be directly mapped to one or more units. A unit is a logical entity (for example, a disk controller) which corresponds to unique input/output (I/O) driver software. A unit may be defined by a unit architecture that defines the format and function of the unit's software visible registers. Within a unit there may be multiple subunits, which can be accessed through independent control registers or uniquely addressed DMA-command sequences. The logical organization of nodes and units is further illustrated in FIG. 3, where a module 301 comprising a plurality of nodes 303–305 is shown. A module is a physical device, coupled to a serial bus 312, having one or more nodes. Each of the nodes may comprise one or more units 307–310. The implementation and operation of the nodes is well known in the art.

Figure 4:
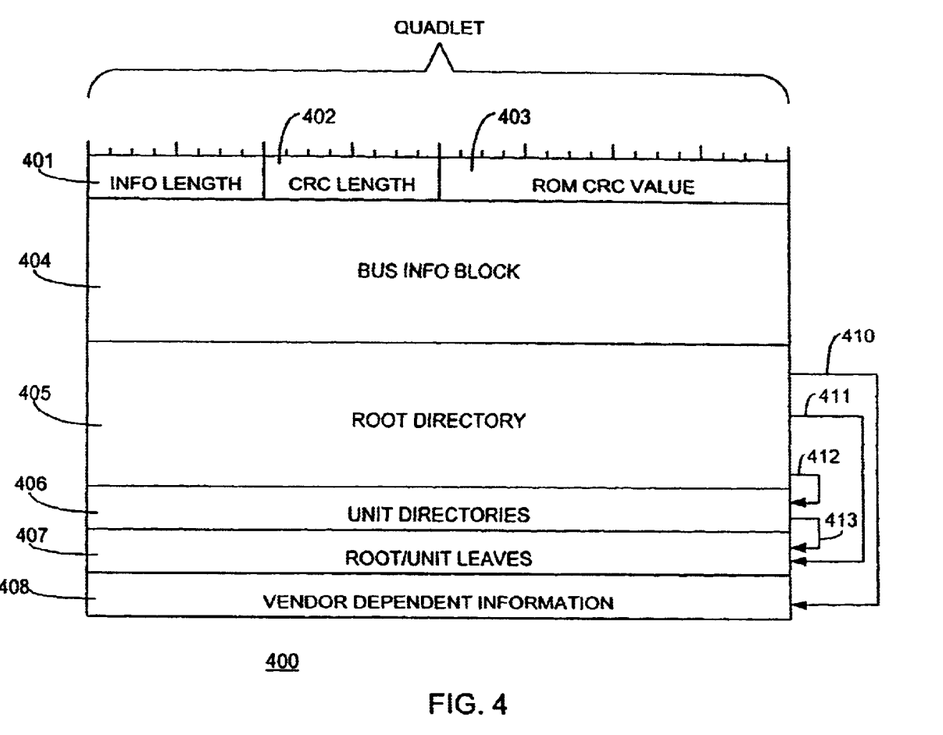
FIG. 4 illustrates an exemplary configuration memory format for use in operating a serial bus.

FIG. 4 illustrates an exemplary configuration memory 400 format that may be incorporated in an implementation of the present invention. In particular, the configuration memory 400 illustrated in FIG. 4 adheres to the general configuration ROM format promulgated by the IEEE 1394 standard and comprises a plurality of major fields 401–408. The "Info Length" field 401 indicates the length of the "Bus Info Block" field 404 and, by virtue of having a value greater than 01 h (1 in hexadecimal notation), indicates that the configuration memory adheres to the general, rather than the minimal, format. The "CRC Length" field 402 indicates the number of quadlets (four aligned bytes of data, as indicated in FIG. 4) covered by the value included in the "ROM CRC Value" field 403. The "ROM CRC Value" 403 is calculated over all of the quadlets forming the configuration memory 400 at the time the configuration memory 400 is created. Later, to verify the integrity of data within the configuration memory 400, an entity reading the configuration memory 400 can re-calculate a new CRC value over the same number of quadlets indicated in the "CRC Length" field 402. If the new CRC value matches the value stored in the "ROM CRC Value" field 403, then no errors are detected in the data included in the configuration memory 400.

The "Bus Info Block" field 404 provides information indicating the capabilities of the node with which the configuration memory 400 is associated. Additionally, the "Bus Info Block" field 404 includes a 64-bit field uniquely identifying the node. The "Root Directory" field 405 indicates the content and organization of the remainder of the configuration memory 400. This is accomplished through the use of pointers schematically illustrated in FIG. 4 by arrows 410–412. It should be noted that the "Info Length", "CRC Length", "ROM CRC Value", "Bus Info Block" and "Root Directory" fields 401405 are all required fields, whereas the remaining fields 406–408 are not required. The "Unit Directories" field 406 comprises information regarding one or more units within the node. Note that individual unit directories may include pointers, represented by an arrow 413, to other root or unit leaves within the "Root/Unit Leaves" field 407. The "Root/Unit Leaves" field 407 comprise information regarding root leaves (defining values relating to the overall node design) and unit leaves (defining values related to a particular unit implementation). Finally, the "Vendor Dependent Information" field 408 includes optional information that a module manufacturer may wish to include, such as hardware and/or software version identifications. Because the entire configuration memory 400 is exposed, other nodes can access the "Root Directory" field 405 and its dependent fields to logically construct a root directory tree, as illustrated in FIG. 5.

Figure 5:
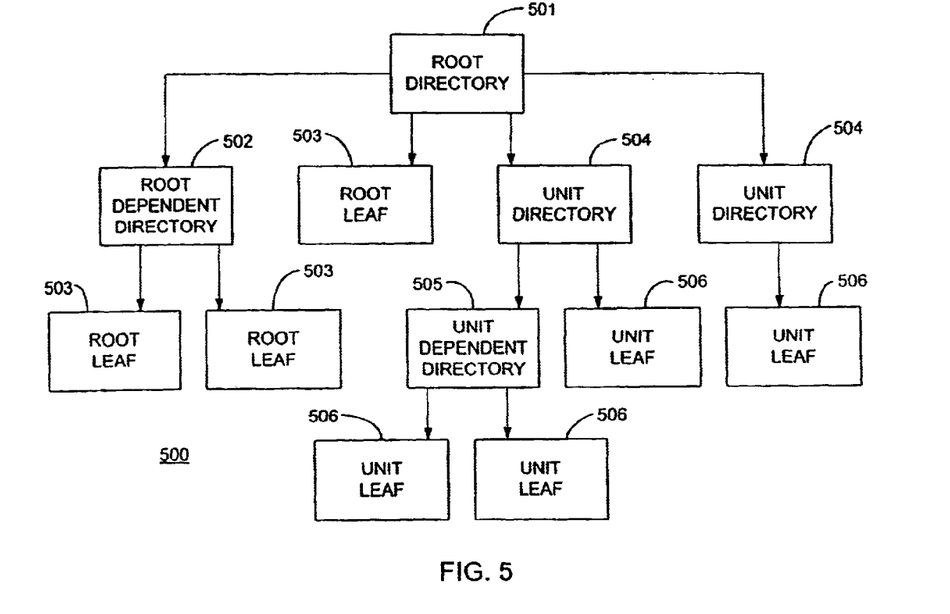
FIG. 5 illustrates an exemplary root tree directory for use in operating a serial bus.

FIG. 5 illustrates an exemplary root directory tree. As shown, the entries within the configuration memory of a node are hierarchically divided into a root directory 501, various root dependent directories 502, root leafs 503, unit directories 504, unit dependent directories 505, and unit leafs 506. As noted above, entries within the root directory 501 may provide information or may provide a pointer to another directory (e.g., a root dependent directory 502) which has the same structure as the root directory 501, or to a root leaf 503 which contains information regarding the node's implementation. The unit directories 504 describe each unit, such as its software version number and its location within the node's address space. Typically, the software version number is used to uniquely identify the appropriate driver software for the node. Based on the root directory tree for a given node, other nodes are able to completely characterize the given node and its associated functionality. As described in further detail below, the present invention exploits this capability to greatly increase the flexibility of computer systems.

Figure 6:
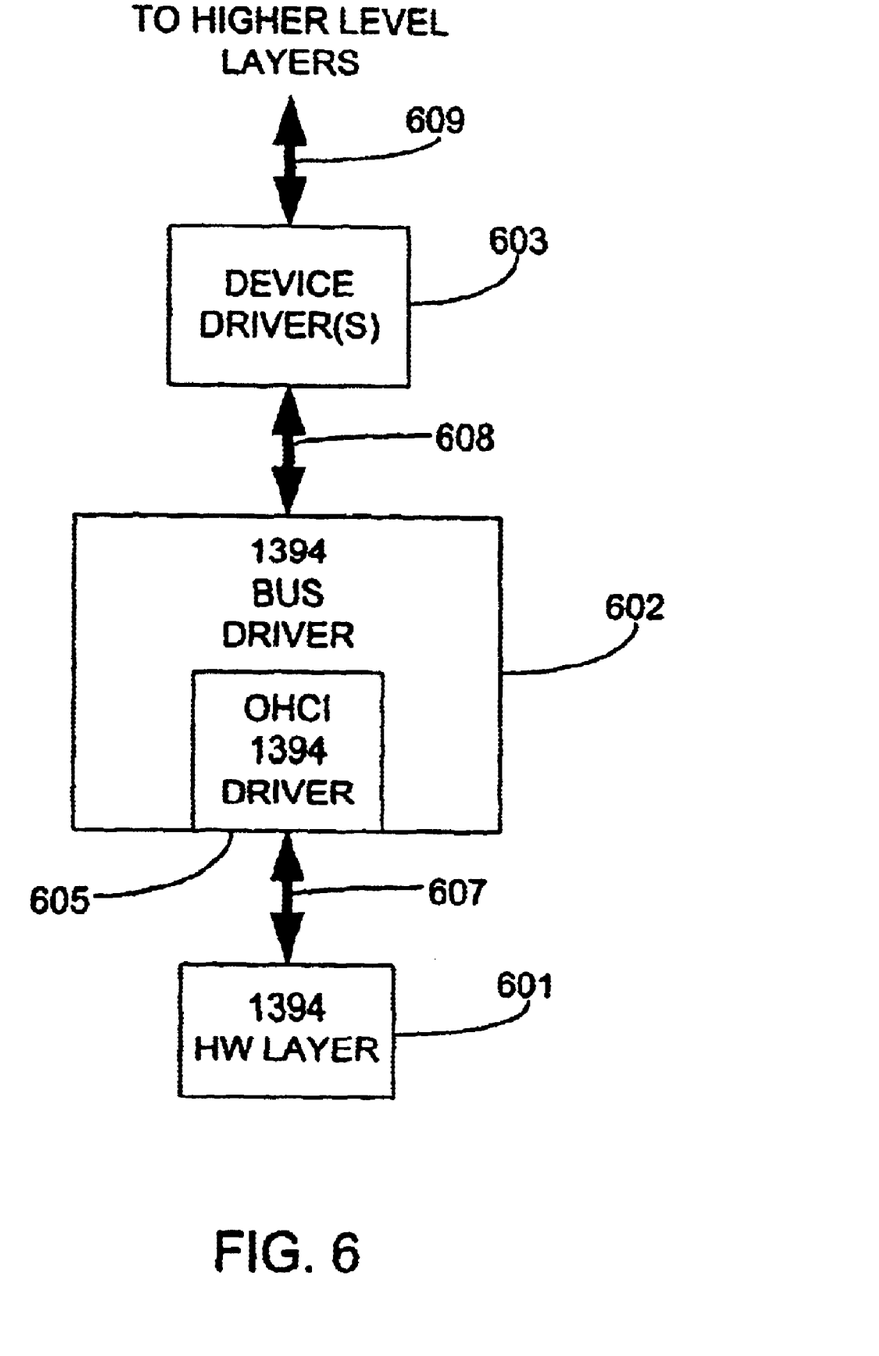
FIG. 6 is a schematic block diagram illustrating a protocol stack that may be used to implement the present invention.

Referring now to FIG. 6, there is illustrated an exemplary protocol stack that may be used to implement the present invention. In particular, the protocol stack comprises an IEEE 1394-compliant hardware layer 601, an IEEE 1394-compliant bus driver 602 and one or more device drivers 603. Particular implementations of the hardware layer 601 are well known in the art and are typically dependent upon the particular device being implemented, i.e., a digital camera, a printer, etc. As noted above, the device drivers 603 are typically software instructions that communicate with and control separate devices for operation. In a preferred embodiment of the present invention, device drivers provide, to the bus driver 602, new unit directories to be added to a node's configuration memory. After modification of the node's configuration memory, a device driver may then request the bus driver to initiate a bus reset, thereby causing other nodes to enumerate the now-modified configuration memory. Furthermore, the device drivers 603 bridge the protocol gap between the IEEE 1394 protocol and whatever protocol is adhered to by its corresponding device.

The bus driver 602 manages communications between the physical bus and higher level protocol layers. In a preferred embodiment, the 1394-compliant bus driver comprises an Open Host Controller Interface (OHCI) driver 605 implementation of the IEEE 1394 link layer protocol. The OHCI is described in the Open Host Controller Interface Specification. Also depicted in FIG. 6 are various interfaces 607-609 between the protocol layers 601-603. The interfaces 607–609 define the types of data that may be exchanged between layers as well as the sequence of exchanges. Operation of the interface 608 between the device drivers 603 and the bus driver 602 and in accordance with the present invention is discussed in greater detail with regard to FIG. 7.

Figure 7:
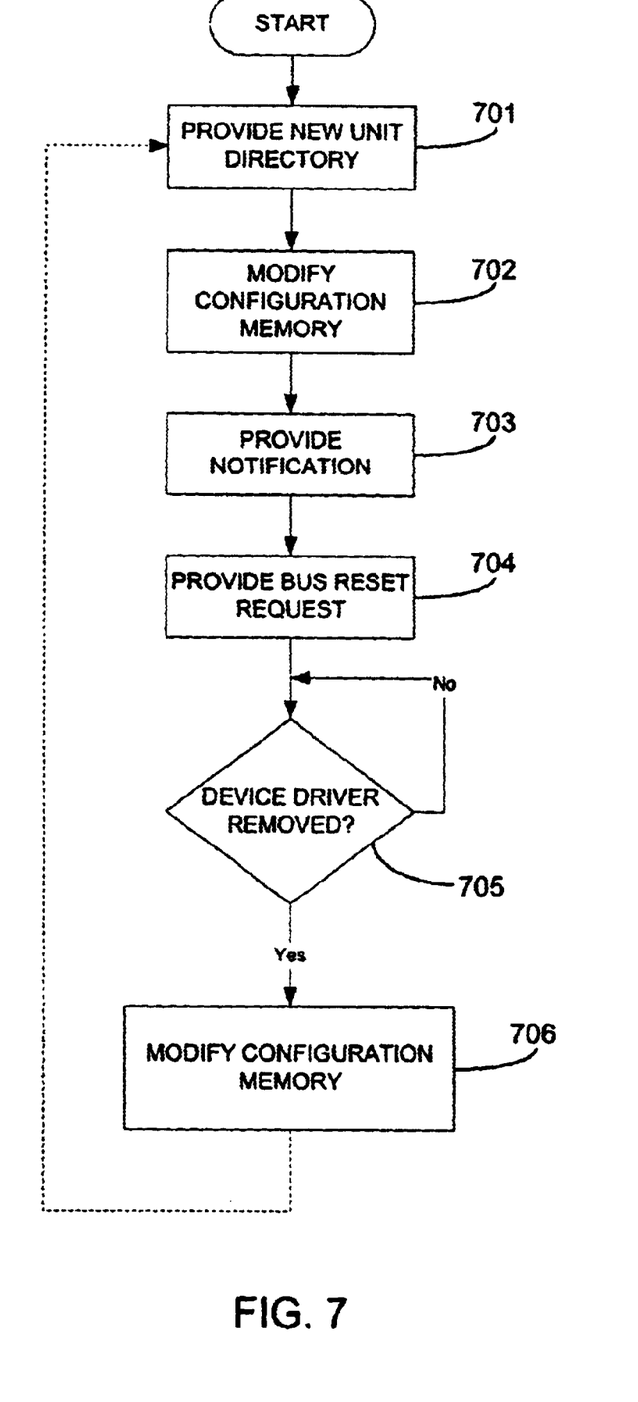
FIG. 7 is a flowchart illustrating a method in accordance with the present invention.

FIG. 7 illustrates a method for communicating between a device driver and a bus driver in accordance with the present invention. The method of FIG. 7 is preferably implemented as computer-executable software instructions included in a device driver and bus driver, where appropriate. At step 701, a device driver provides a new unit directory to the bus driver. In practice, this can be done by passing a pointer to the new unit directory and letting the bus driver copy the new unit directory to the necessary location. The new unit directory, in conformance with the IEEE 1394 standard, describes the functionality being added to the node. In practice, the functionality being added need not be supported by an actual physical device, but could also be supported by an emulation capability. Furthermore, the new unit directory, in accordance with instructions received from the device driver, could by used as a replacement for, rather than in addition to, one or more existing unit directories.

At step 702, the bus driver, responsive to the identification of the new unit directory, will modify the configuration memory to include the new unit directory. To this end, the configuration memory must be re-parsed to include the new unit directory. This entails appending the new unit directory to the configuration memory, for example, by adding the new unit directory within the "Unit Directories" field 406. Re-parsing also requires updating the CRC length and CRC value to reflect the added unit directory. The bus driver also re-calculates offsets (pointers) within the root directory of the configuration memory to accurately reflect the addition of the new unit directory.

At step 703, the bus driver, having completed the modification, provides a notification to the device driver that the configuration memory has been modified. The particular form of the notification is a matter of design choice. The device driver, in response to the notification, will in turn provide a bus reset request to the bus driver at step 704. The bus reset request instructs the bus driver to initiate a bus reset procedure; in an IEEE 1394-compliant system, this is accomplished through the setting of an Initiate Bus Reset bit or an Initiate Short Bus Reset bit, either of which will cause the hardware associated with the resetting node to reset the bus. A bus reset will cause other nodes residing on the bus to enumerate the node, thereby exposing the new unit directory and its associated functionality.

At step 705, it is determined by the bus driver whether the device driver that caused the addition of the new unit directory to the configuration memory has been removed. If the device driver has been removed, regardless of the reason for the removal, the bus driver recognizes the removal using known techniques and, at step 706, again modifies the configuration memory in order to remove the unit directory the was added at step 702. In this manner, the bus driver effectively restores the configuration memory to its state prior to step 702. To this end, the bus driver re-parses the configuration memory to exclude the previously-added unit directory. Also, the offsets within the root directory are re-calculated to reflect the exclusion of the unit directory. Processing may then continue at step 701 with the addition of yet another new directory, if provided.

Figure 8:
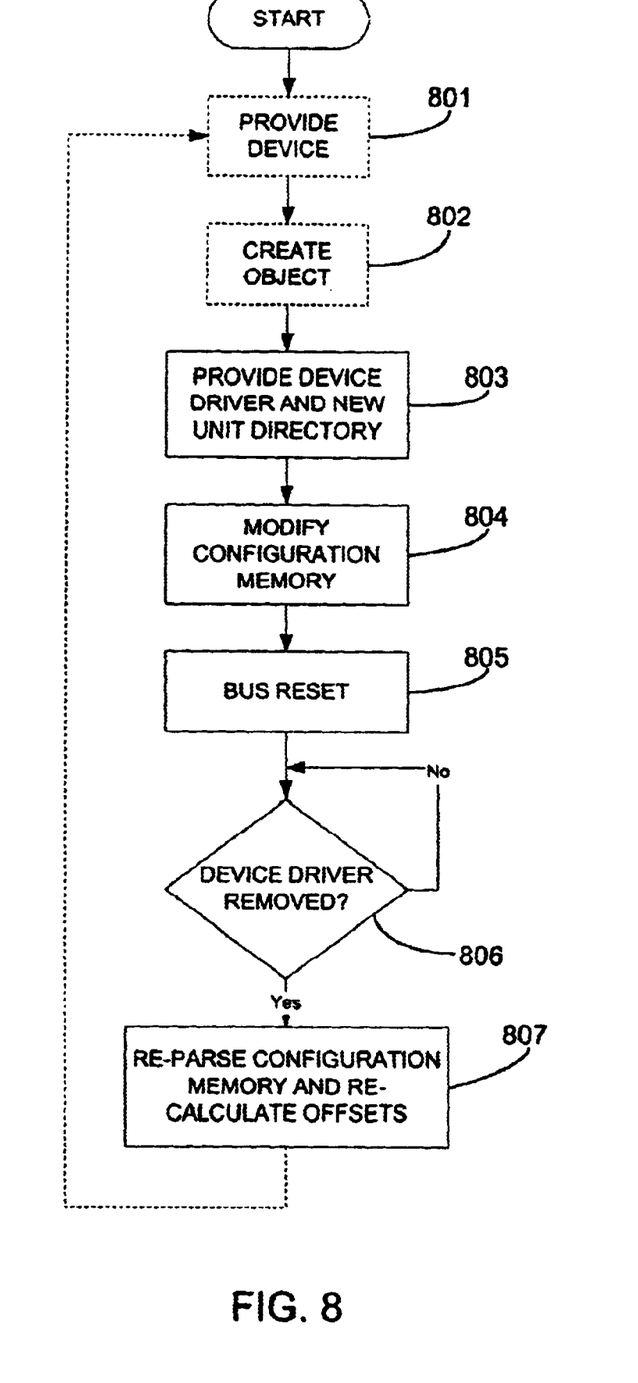
FIG. 8 is a flowchart illustrating another method in accordance with the present invention.

FIG. 8 illustrates a method for exposing functionality of a device over a serial bus in accordance with the present invention. The method of FIG. 8 is preferably implemented using a personal computer or the like coupled to the serial bus and, where appropriate, is preferably implemented as computer-executable software instructions. At step 801, a device (e.g., a digital camera, printer, etc.) may be provided. It is understood that a device may be provided physically or emulated (using software instructions, for example). In an embodiment of the present invention, the device, if provided or emulated, is locally available to a given computer but otherwise unavailable via the serial bus. It should be noted that the present invention does not require a physical device to be provided or emulated. For example, the present invention can be employed during the testing of a device driver under development; in such that case, actual device or emulation thereof is not necessarily required.

At step 802, an object, in the form of a data structure, may be created corresponding to the device. The use of objects representing physical devices is well known in the art. However, it is again understood that the provision of an object is not required by the present invention where, for example, a device driver is being tested.

A device driver corresponding to a device is provided at step 803. The provision of device drivers is well known in the art and need not be discussed in greater detail here. Also at step 803, a new unit directory is provided. As described above, the new unit directory describes the functionality of the device that was added or emulated. Where an object corresponding to the device has been created, the device driver is loaded onto the object in accordance with known techniques.

At step 804, the device driver and a bus driver operate in accordance with the method of FIG. 7 to modify configuration memory to include the new unit directory. Further, at step 805, the device driver and bus driver again cooperate to cause a bus reset, thereby forcing other nodes residing on the serial bus to enumerate the modified configuration memory. Steps 806 and 807 are essentially identical to steps 705 and 706, respectively.

Figure 9:
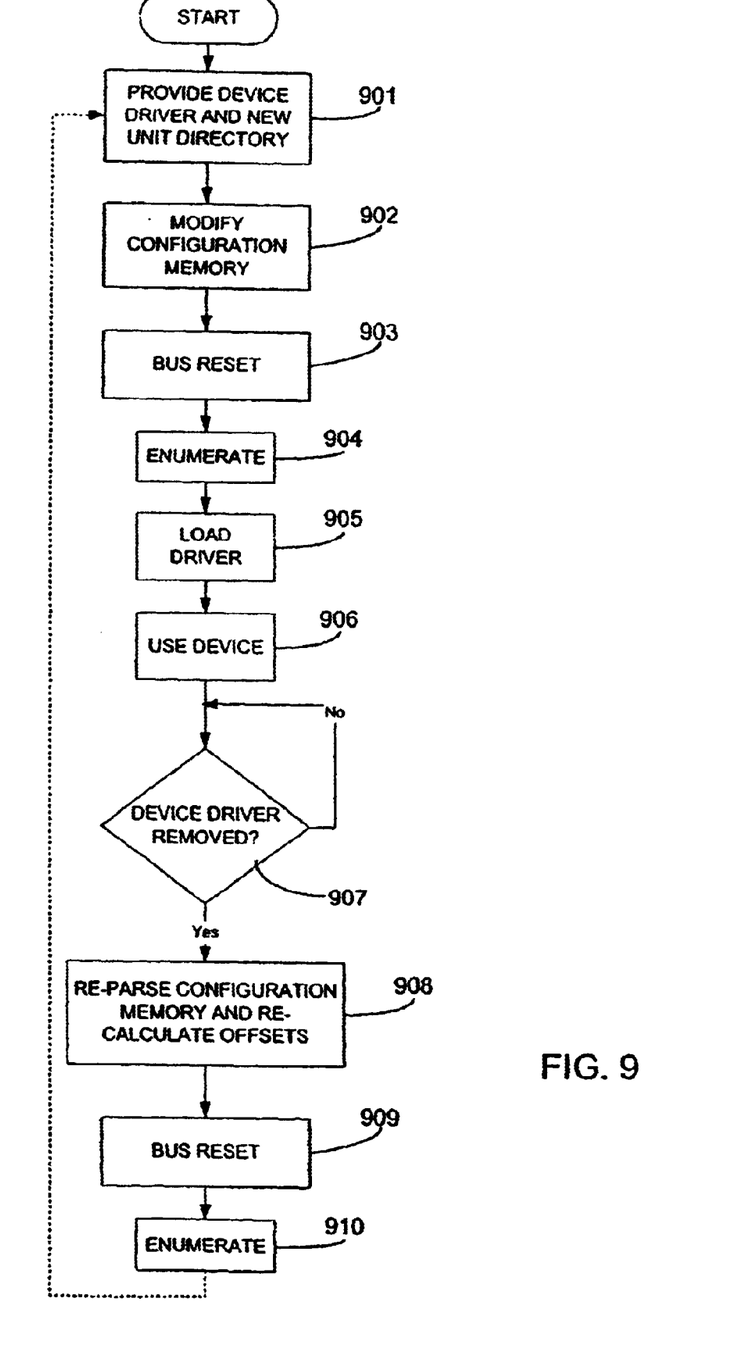
FIG. 9 is a flowchart illustrating yet another method in accordance with the present invention.

FIG. 9 illustrates a method that may be beneficially applied to a system of devices coupled together via a serial bus. The method of FIG. 8 is preferably implemented, where appropriate, as computer-executable software instructions executed by the appropriate devices within the system. Steps 901 through 903 are essentially equivalent to steps 803 through 805, respectively, and are preferably carried out by a first personal computer or the like coupled to the serial bus. Furthermore, in an embodiment of the present invention, at least one other computer is coupled to the first computer via the serial bus. Referring to the example of FIG. 2, the computer 201, rather than being coupled to the printer 212, could instead be coupled to another computer implementing a 1394-compliant node.

Regardless of what devices are coupled (via the serial bus) to the computer performing steps 901–903, such devices, at step 904, enumerate the configuration memory that was modified at step 902 in response to the bus reset of step 903. As described above, the process of enumerating the modified configuration memory causes the enumerating device to load the appropriate drivers at step 905, if available, necessary to allow the enumerating device to use, at step 906, the functionality now being exposed via the modified configuration memory. In this manner, the present invention provides greater flexibility to computer systems because device functionality can be more readily shared between devices.

Steps 907 and 908, essentially identical to steps 705 and 706, respectively, are performed by the computer that modified its configuration memory at step 902 in order to update its configuration memory when the device driver is removed. Likewise, a bus reset at step 909 causes the other devices to re-enumerate at step 910 the modified configuration memory, thereby allowing the other devices to learn that the previously-available functionality has been removed or otherwise modified. The steps illustrated in FIG. 9 may be repeated as often as necessary in response to the addition and/or removal of device functionality in order to constantly update the system of devices.

What has been described is merely illustrative of the application of the principles of the present invention. Other arrangements and methods can be implemented by those skilled in the art without departing from the-spirit and scope of the present-invention.

What is claimed is:

1. A method of communicating between a device driver and a bus driver in a computer, the method comprising steps of:
    providing, by the device driver to the bus driver, a new unit directory, representative of a newly-altered functionality of an existing device associated with the device driver, to be appended to a configuration memory;
    responsive to the new unit directory, dynamically modifying, by the bus driver, the configuration memory to include a pointer to the new unit directory, wherein the pointer is added to a root directory forming a part of the configuration memory; and
    providing, by the bus driver to the device driver, a notification that the configuration memory has been modified.

2. The method of claim 1, wherein the step of modifying the configuration memory further comprises steps of:
    re-parsing the configuration memory to include the new unit directory; and
    re-calculating offsets within the root directory to include the new unit directory, thereby providing the pointer to the new unit directory.

3. The method of claim 1, further comprising a step of:
    responsive to the notification that the configuration memory has been modified, providing, by the device driver to the bus driver, a bus reset request that causes the bus driver to initiate a bus reset procedure.

4. A method as recited in claim 1 for removing the new unit directory, further comprising steps of:
    ascertaining that the device driver has been removed;
    re-parsing the configuration memory to exclude the new unit directory; and
    re-calculating offsets within the root directory to exclude the new unit directory.

5. The method of claim 1, wherein the bus driver is an IEEE 1394 Serial Bus compliant bus driver.

6. In a computer comprising a node residing on a communication bus, wherein a configuration memory is associated with the node, a method for exposing a newly-altered functionality of an existing device residing on the communication bus, the method comprising steps of:
    providing a device driver and a new unit directory corresponding to the newly-altered functionality of the existing device;
    dynamically modifying the configuration memory to include a pointer to the new unit directory in a root directory forming a part of the configuration memory, wherein the configuration memory is exposed to other nodes residing on the communication bus; and
    initiating a bus reset procedure that causes the other nodes to enumerate the configuration memory to include the new unit directory.

7. The method of claim 6, wherein the step of modifying the configuration memory further comprises steps of:
    re-parsing the configuration memory to include the new unit directory; and
    re-calculating offsets within the root directory to include the new unit directory, thereby providing the pointer to the new unit directory.

8. The method of claim 6, further comprising a step, prior to the step of providing the device driver and the new unit directory, of:
    creating an object, residing on the computer, representative of the device.

9. A method of claim 8, wherein the step of providing the device driver further comprises loading the device driver in the object representative of the device.

10. The method as recited in claim 8 for testing the device driver, further comprising a step, prior to the step of enumerating the external node, of:
    providing, as the device, another computer that emulates functionality of the device.

11. A method as recited in claim 6 for removing the new unit directory, further comprising steps of:
    ascertaining that the device driver has been removed;
    re-parsing the configuration memory to exclude the new unit directory; and
    re-calculating offsets within the root directory to exclude the new unit directory.

12. In a system comprising a communication bus, a computer coupled to the communication bus and at least one device coupled to the communication bus, wherein the computer and the at least one device each comprise a configuration memory that is exposed on the communication bus, a method for exposing a newly-altered functionality of the computer, the method comprising steps of:
    providing, by the computer, a device driver and a new unit directory corresponding to the newly-altered functionality of the computer;
    dynamically modifying, by the computer, the computer's configuration memory to include a pointer to the new unit directory in a root directory forming a part of the computer's configuration memory;
    enumerating, by the at least one device, the computer's configuration memory including the new unit directory; and
    loading, by the at least one device and in response to the enumeration by the device of the computer's configuration memory, another device driver corresponding to the newly-altered functionality of the computer.

13. The method of claim 12, further comprising a step, prior to the step of enumerating, of:
    initiating, by the computer, a bus reset procedure that causes at least one device to enumerate at least the computer's configuration memory.

14. The method of claim 12, further comprising a step of:
    using, by the at least one device, the newly-altered functionality of the computer via the communication bus and the other bus driver.

15. The method of claim 12, further comprising steps of:
    removing, by the computer, the new unit directory from the computer's configuration memory; and
    enumerating, by the at least one device, the computer's configuration memory excluding the new unit directory.

16. The method of claim 12, wherein the at least one device comprises another computer.

17. A computer coupled to a communication bus and having a processor coupled to a memory, the memory storing computer-readable instructions that, when executed by the processor, cause the computer to comprise:
- a device driver that provides a new unit directory corresponding to a newly-altered functionality of an existing device residing on the communication bus; and
- a bus driver that controls communications between the computer and the communication bus, and that modifies a configuration memory, based on the new unit directory, to include a pointer to the new unit directory in a root directory forming a part of the configuration memory, wherein the configuration memory is exposed to other devices residing on the communication bus.

18. The computer of claim 17, wherein the device driver requests the bus driver to initiate a bus reset procedure that causes the other devices to enumerate the configuration memory including the new unit directory.

19. The computer of claim 17, wherein the bus driver can ascertain when the device driver has been removed and responsively re-parses the configuration memory to exclude the new unit directory and re-calculates offsets within the root directory to exclude the new unit directory.

20. The computer of claim 17, wherein the bus driver is an IEEE 1394 Serial Bus compliant bus driver.

21. A system comprising the computer of claim 17, the system further comprising:
- another computer, coupled to the communication bus, as one of the other devices.

* * * * *

UNITED STATES PATENT AND TRADEMARK OFFICE
CERTIFICATE OF CORRECTION

PATENT NO.      : 6,643,714 B1
DATED           : November 4, 2003
INVENTOR(S)     : Georgios Chrysanthakopoulos It is certified that error appears in the above-identified patent and that said Letters Patent is hereby corrected as shown below:

Column 5,
Line 13, "and" has been removed.

Column 9,
Line 8, "the-spirit" has been replaced with -- the spirit --;
Line 9, "present-invention" has been replaced with --present invention --;
Line 40, "A method as recited in claim 1 for removing the new unit directory," has been replaced with -- The method of claim 1 --;

Column 10,
Line 11, "A method" has been replaced with -- The method --;
Line 19, "A method as recited in claim 6 for removing the new unit directory," has been replaced with -- The method of claim 6 --.

Signed and Sealed this

Twenty-fourth Day of August, 2004

JON W. DUDAS
*Director of the United States Patent and Trademark Office*